(12) United States Patent
Uchida et al.

(10) Patent No.: US 7,453,592 B2
(45) Date of Patent: Nov. 18, 2008

(54) IMAGE PROCESSING SYSTEM

(75) Inventors: Fumikage Uchida, Asaka (JP); Tomohiro Suzuki, Nishitokyo (JP); Yuji Tamura, Hachioji (JP); Tetsuya Ishikawa, Hachioji (JP); Tadashi Sumi, Tokyo (JP); Tomoya Ogawa, Hachioji (JP)

(73) Assignee: Konica Corporation (JP)

( * ) Notice: Subject to any disclaimer, the term of this patent is extended or adjusted under 35 U.S.C. 154(b) by 1147 days.

(21) Appl. No.: 10/643,385

(22) Filed: Aug. 18, 2003

(65) Prior Publication Data

US 2004/0042040 A1 Mar. 4, 2004

(30) Foreign Application Priority Data

Aug. 27, 2002 (JP) .............................. 2002-247113

(51) Int. Cl.
G06F 3/12 (2006.01)
(52) U.S. Cl. ...................................... 358/1.15; 710/16
(58) Field of Classification Search ................ 358/1.15, 358/1.13, 443, 448; 710/16; 395/112, 114, 395/113, 117

See application file for complete search history.

(56) References Cited

U.S. PATENT DOCUMENTS

| | | | |
|---|---|---|---|
| 3,055,431 A | 9/1962 | Clark et al. | |
| 3,318,384 A | 5/1967 | Brown | |
| 3,420,306 A | 1/1969 | Brown | |
| 3,467,184 A | 9/1969 | Young | |
| 3,516,493 A | 6/1970 | McGill | |
| 4,791,988 A | 12/1988 | Trevillion | |
| 5,128,878 A * | 7/1992 | Gore et al. | ................... 345/502 |
| 5,333,246 A * | 7/1994 | Nagasaka | ................... 345/619 |
| 5,784,062 A * | 7/1998 | Adachi et al. | ................ 345/418 |
| 5,978,563 A * | 11/1999 | Kawamoto et al. | ......... 358/1.17 |
| 5,987,226 A * | 11/1999 | Ishikawa et al. | ........... 358/1.13 |
| 6,091,507 A * | 7/2000 | Vatland et al. | .............. 358/1.15 |
| 6,311,778 B1 | 11/2001 | Carisella et al. | |
| 6,318,461 B1 | 11/2001 | Carilsell | |
| 2002/0097433 A1 * | 7/2002 | Chang et al. | ................ 358/1.15 |

FOREIGN PATENT DOCUMENTS

| | | |
|---|---|---|
| EP | 0460993 A2 | 12/1991 |
| EP | 0460993 A3 | 2/1993 |
| JP | 06-168087 | 6/1994 |
| JP | 3168580 | 3/2001 |

* cited by examiner

*Primary Examiner*—King Poon
*Assistant Examiner*—Allen H Nguyen
(74) *Attorney, Agent, or Firm*—Cantor Colburn LLP

(57) ABSTRACT

There is described a network system for processing image data and printing an image based on the image data. The system includes image-processing apparatus and an image printing apparatus coupled to each other in a network. Each of the image-processing apparatus includes a rasterization processing section to generate first rasterized pixel data; an image data transmitting section to transmit the image data to another image-processing apparatus, which generates second rasterized pixel data; a pixel data receiving section to receive the second rasterized pixel data; and a pixel data transmitting section to transmit either the first rasterized pixel data or the second rasterized pixel data to the image printing apparatus as print-rasterized pixel data. The image printing apparatus includes a print-rasterized pixel data receiving section to receive the print-rasterized pixel data in order to print the image according to the print-rasterized pixel data.

3 Claims, 5 Drawing Sheets

IMAGE PROCESSING SYSTEM

BACKGROUND OF THE INVENTION

The present invention relates to an image processing system, and in particular, to an image processing system wherein an image processing apparatus having an image reading means, an image printing apparatus and an information processing apparatus are connected to each other through a network.

There has been known an image processing system wherein, when a user gives instructions for printing through PC (a personal computer), a print JOB is transmitted from the PC, and an image processing apparatus that has received the print JOB conducts a rasterization processing to transmit the results of the rasterization processing to an image printing apparatus in which image printing is carried out.

For example, in "page description language parallel processing print system" described in TOKKAIHEI No. 6-168087, a print JOB is split into a plurality of sections, and a part of them is transferred to another information processing apparatus on the network (or all of them are transferred, and a range of each allotment is indicated) to rasterize in parallel so as to conduct rasterization processing at high speed.

Further, in "page description language interpreter" described in U.S. Pat. No. 3,168,580, there are provided a means to split a print JOB into a plurality of partial files and to transfer them to other information processing equipment connected roughly and a means to collect the sections rasterized by other information processing equipment to compound them, and when participation to rasterization in parallel is requested, a response is made depending on the load to rasterize the partial file when the load allows it.

However, in the conventional technology mentioned above, there have been the following problems.

Namely, in both inventions described respectively in TOKKAIHEI No. 6-168087 and U.S. Pat. No. 3,168,580, it has been necessary to split one print JOB into a plurality of partial files (or to judge a splitting range) and to compound the rasterized partial files in another apparatus having a rasterization function, which has caused a problem of complicated software and apparatus. Further, there has also been a problem that the splitting and compounding processing result in overhead.

SUMMARY OF THE INVENTION

To overcome the abovementioned drawbacks in conventional image processing systems, it is an object of the present invention to provide an image processing system which requires neither splitting of print JOB nor compounding of pixel information and can realize high-speed rasterization processing when splitting rasterization processing to a plurality of apparatuses by utilizing network surroundings.

Accordingly, to overcome the cited shortcomings, the abovementioned object of the present invention can be attained by network systems described as follow.

(1) A network system for processing image data and printing an image based on the image data, comprising: a plurality of image-processing apparatus coupled to each other through a network; and an image printing apparatus coupled to the plurality of image-processing apparatus through the network; wherein each of the plurality of image-processing apparatus includes: a rasterization processing section to apply a rasterization processing to the image data so as to generate first rasterized pixel data; an image data transmitting section to transmit the image data to another image-processing apparatus, in which the rasterization processing is applied to the image data so as to generate second rasterized pixel data; a pixel data receiving section to receive the second rasterized pixel data transmitted from the other image-processing apparatus; and a pixel data transmitting section to transmit either the first rasterized pixel data or the second rasterized pixel data to the image printing apparatus as print-rasterized pixel data; and wherein the image printing apparatus includes: a print-rasterized pixel data receiving section to receive the print-rasterized pixel data, being either the first rasterized pixel data or the second rasterized pixel data, through the network, in order to print the image according to the print-rasterized pixel data.

(2) The network system of item 1, wherein the pixel data transmitting section transmits either the first rasterized pixel data or the second rasterized pixel data, which is acquired earlier as the print-rasterized pixel data completed as a whole, to the image printing apparatus.

(3) A network system for processing image data and printing an image based on the image data, comprising: a plurality of image-processing apparatus coupled to each other through a network; and an image printing apparatus coupled to the plurality of image-processing apparatus through the network; wherein each of the plurality of image-processing apparatus includes: a rasterization processing section to apply a rasterization processing to the image data so as to generate rasterized pixel data; an image data transmitting section to transmit the image data and a completed-part of the rasterized pixel data, rasterization for which are completed by a time when a predetermined condition occurs in mid-course of the rasterization processing for the image data, to another image-processing apparatus; and wherein the image printing apparatus includes: a rasterized pixel data receiving section to receive the rasterized pixel data through the network, in order to print the image according to the rasterized pixel data.

(4) The network system of item 3, wherein, in the other image-processing apparatus, the rasterization processing is applied to a residual part of the image data so as to generate a residual part of the rasterized pixel data; and wherein the other image-processing apparatus transmits the rasterized pixel data to the image printing apparatus as an addition of the completed-part and the residual part.

(5) The network system of item 3, wherein the image data transmitting section transmits the image data and a completed-part of the rasterized pixel data to a plurality of other image-processing apparatus.

Further, to overcome the abovementioned problems, other network systems, embodied in the present invention, will be described as follow:

(6) An image-processing system, characterized in that,
in the image-processing system, which is so constituted that a plurality of image-processing apparatus are coupled to an image printing apparatus, having an image printing means for conducting a printing operation onto a paper, through a network,
the image-processing apparatus is provided with a rasterization processing means for applying a rasterization processing to image data, an image data transmitting means for transmitting the image data to another image-processing apparatus in order to perform the rasterization processing by the other image-processing apparatus coupled to the network, a first pixel information receiving means for receiving pixel information as a result of the rasterization processing by the other image-processing apparatus coupled to the network and a pixel information transmitting means for transmitting pixel information received by the first pixel information receiving means to the image printing means, and the image printing apparatus is provided with a second pixel information receiving means for receiving the pixel information as a result of the rasterization processing by the rasterization processing means, and the image printing means conducts the printing operation based on the pixel information received by the second pixel information receiving means.

(7) The image-processing system, described in item 6, characterized in that the image information transmitting means transmits either the pixel information as a result of the rasterization processing by the rasterization processing means or the pixel information received by the first pixel information receiving means, which is acquired earlier, to the image printing apparatus.

(8) An image-processing system, characterized in that, in the image-processing system, which is so constituted that an image-processing apparatus is coupled to an image printing apparatus, having an image printing means for conducting a printing operation onto a paper, through a network, the image-processing apparatus is provided with a rasterization processing means for applying a rasterization processing to image data, and an image data transmitting means for transmitting the image data and pixel information, for which rasterization processing is already completed, to another image-processing apparatus in order to conduct a continuation of the rasterization processing in the other image-processing apparatus coupled to the network, when a predetermined condition occurs in mid-course of the rasterization processing, and the image printing apparatus is provided with a pixel information receiving means for receiving the pixel information as a result of the rasterization processing by the rasterization processing means, and the image printing means conducts the printing operation based on the pixel information received by the pixel information receiving means.

(9) The image-processing system, described in item 8, characterized in that the rasterization processing means conducts the continuation of the rasterization processing, based on the pixel information, for which rasterization processing is already completed and which are transmitted from the other image-processing apparatus coupled to the network, and the image data.

(10) The image-processing system, described in anyone of items 6-8, characterized in that other image-processing apparatus, being transmitting objects of the image data transmitting means are plural.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
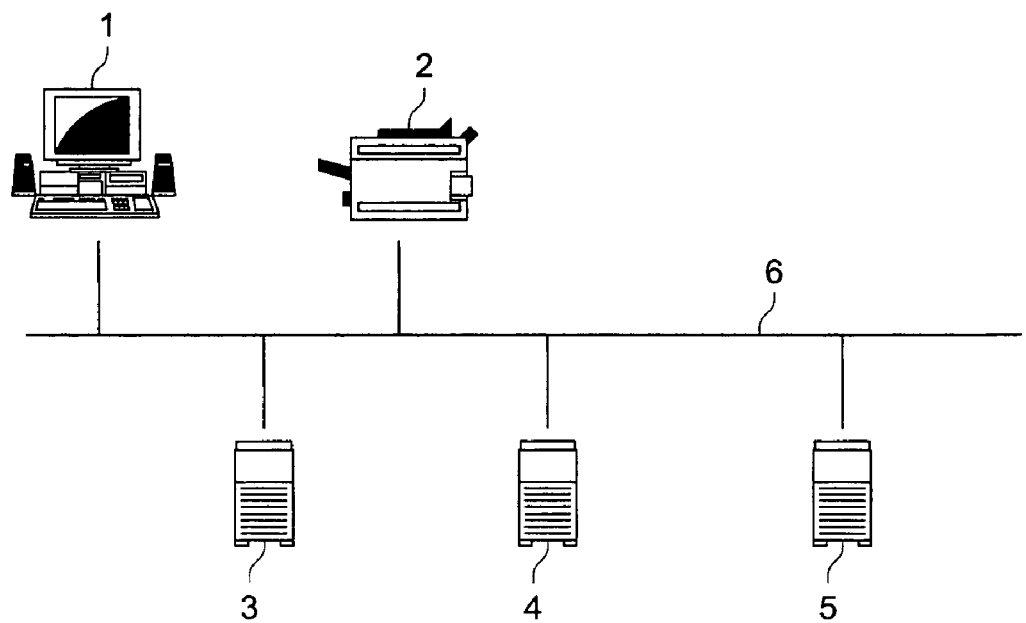
FIG. 1 is a block diagram showing the structure of an embodiment of an image processing system of the invention.

An embodiment of the invention will be explained as follows, referring to the drawings.

FIG. 1 is a block diagram showing the structure of an embodiment of an image processing system of the invention.

As shown in FIG. 1, the image processing system of the present embodiment is composed of information processing apparatus 1, image printing apparatus 2 and image processing apparatuses 3, 4 and 5, which are connected to each other with network 6. As the information processing apparatus 1, a personal computer, for example, can be used.

The image printing apparatus 2 has therein an image printing means that prints on a blank based on image information resulted from rasterization processing. The image processing apparatuses and the image printing apparatus can also be used after being unified solidly, and in this case, it is possible to realize a function as an image forming apparatus such as a digital copying machine, if there is provided a scanner section that reads images from a document and outputs them to the image processing apparatuses.

As the network 6, it is also possible to use an image processing apparatus of the other through the Internet, without being limited to those on a small scale such as LAN.

Figure 2:
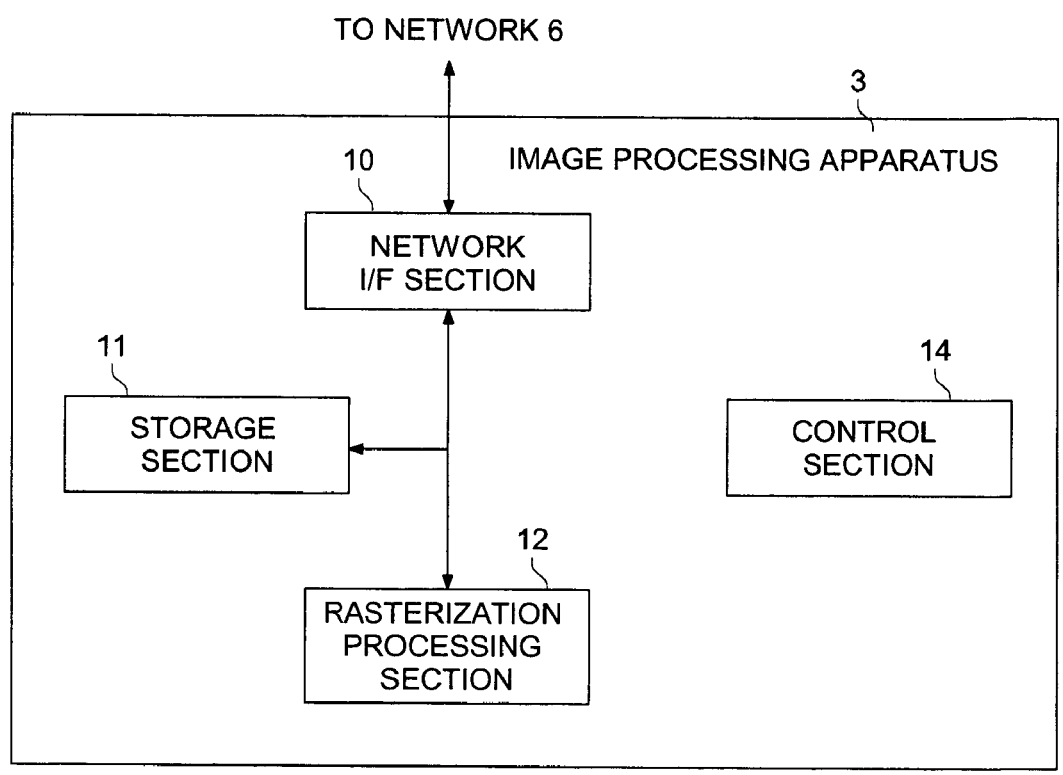
FIG. 2 is a block diagram showing the structure of image processing apparatus 3 shown in FIG. 1.

FIG. 2 is a block diagram showing the structure of image processing apparatus 3 shown in FIG. 1.

Incidentally, the image processing apparatus 3 will be explained here as a representative, because all of image processing apparatuses 3-5 shown in FIG. 1 are the same in terms of structure.

As shown in FIG. 2, the image processing apparatus 3 is composed of network I/F section 10 representing an interface with network 6, storage section 11 that stores data, rasterization processing section 12 that conducts rasterization processing for image data and control section 14 that controls overall operations.

The rasterization processing section 12 has a function as a rasterizer that rasterizes image data included in print JOB received through the network I/F section 10 and obtains a raster image.

Into the image processing apparatus 3, there is inputted print JOB through the network 6 from, for example, the information processing apparatus 1. This print JOB is composed of an image file in which image data are included and a processing file in which the contents of processing to be conducted in the course of printing image data are included, and the contents of processing include, for example, the pages of the image to be printed, the number of sets to be printed, whether holes are punched on a blank or not, whether blanks are stapled or not, and whether plural images are laid out on a sheet of blank to be printed (image layout) or not.

Figure 3:
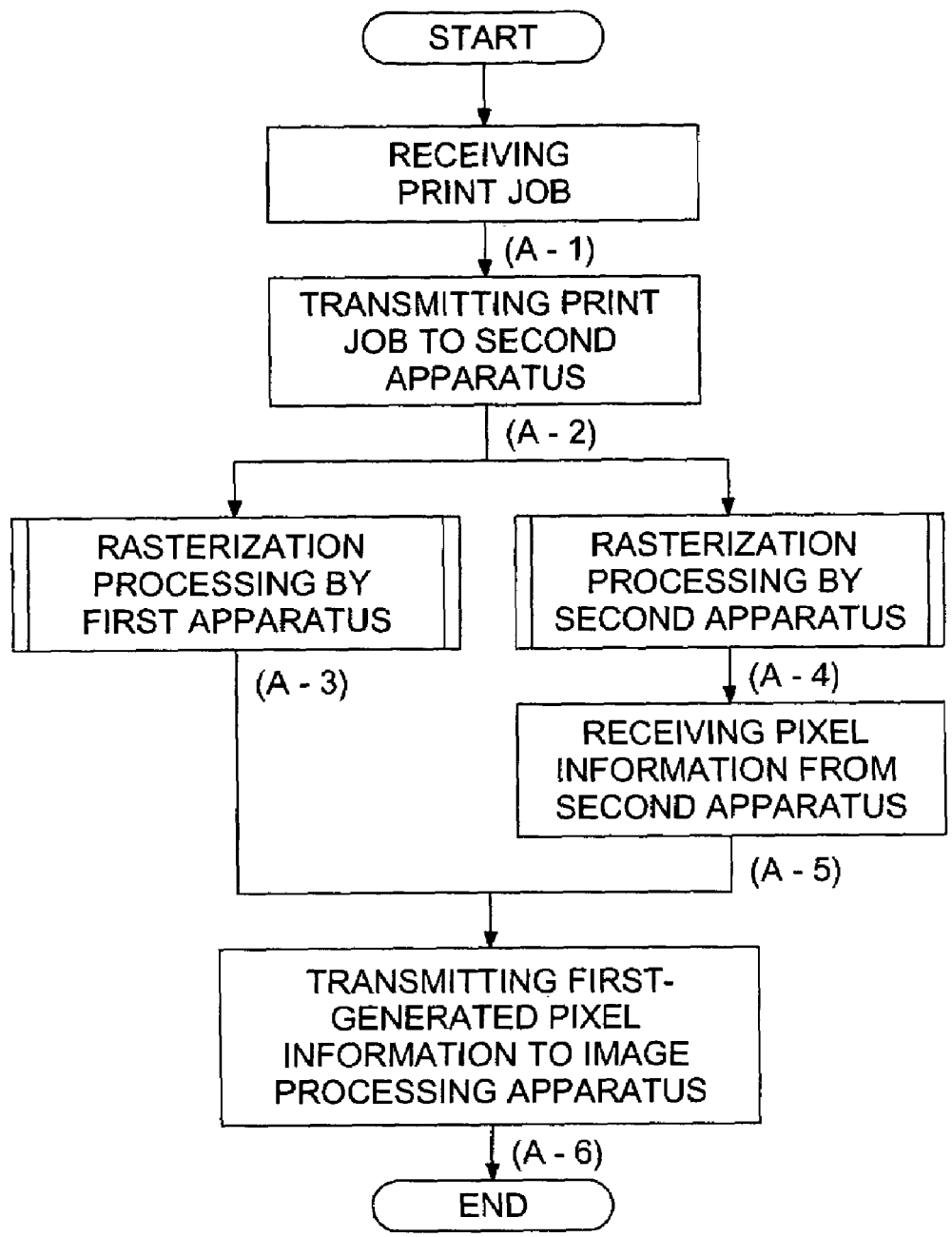
FIG. 3 is a diagram showing the flow chart of the first example of operations of the image processing system shown in FIG. 1.

FIG. 3 is a diagram showing the flow chart of the first example of operations of the image processing system shown in FIG. 1.

When the image processing apparatus 3 receives print JOB (A-1), the print JOB thus received is transmitted to image processing apparatus 4 representing another image processing apparatus (A-2). In this case, IP address of the image processing apparatus 3 itself (a peculiar address other than IP address is also acceptable) and additional information such as a JOB number of the print JOB are described in the processing file to be transmitted simultaneously. This additional information may either be a file separated from the print JOB or be the same one file.

Incidentally, though there is explained an example wherein print JOB is transmitted to image processing apparatus 4 as another image processing apparatus in step (A-2) in the present example, the invention is not limited to this, and it is also possible to arrange so that print JOB is transmitted to a plurality of image processing apparatuses in step (A-2), and rasterization processing is conducted on all or either of the plural image processing apparatuses.

Next, in the image processing apparatus 3, print JOB is transmitted to another image processing apparatus in step (A-2), and then, rasterization processing is conducted for print JOB by rasterization processing section 12 of the image processing apparatus 3 itself (A-3). However, when the image processing apparatus 3 is in the preceding rasterization processing for another JOB, or when rasterization processing cannot be started, the image processing apparatus 3 turns out to be in stand-by for processing.

On the other hand, in the image processing apparatus 4 that has received print JOB from image processing apparatus 3, rasterization processing for the received print JOB is conducted by the rasterization processing section of the image processing apparatus 4 (A-4), and when the rasterization processing is completed, pixel information of the results of the rasterization processing and a processing file in which a JOB number of print JOB is described are transmitted to the image processing apparatus 3 representing a client which receives them (A-5).

In the image processing apparatus 3, when pixel information is received in step (A-5), its JOB is confirmed whether it is the image processing apparatus 3 or not in storage section 11, and when it is not "printing is over" yet, the pixel information is transmitted to image printing apparatus 2 for execution of printing and its JOB is made to be "printing is over" in storage section 11, and rasterization processing to be conducted by rasterization processing section 12 of the image processing apparatus 3 itself is cancelled. When its JOB is "printing is over", pixel information received in step (A-5) is discarded. When rasterization processing to be conducted by rasterization processing section 12 of the image processing apparatus 3 itself is completed, pixel information thus obtained is transmitted to image printing apparatus 2 for execution of printing and its JOB is made to be "printing is over" in storage section 11 (A-6).

Figure 4:
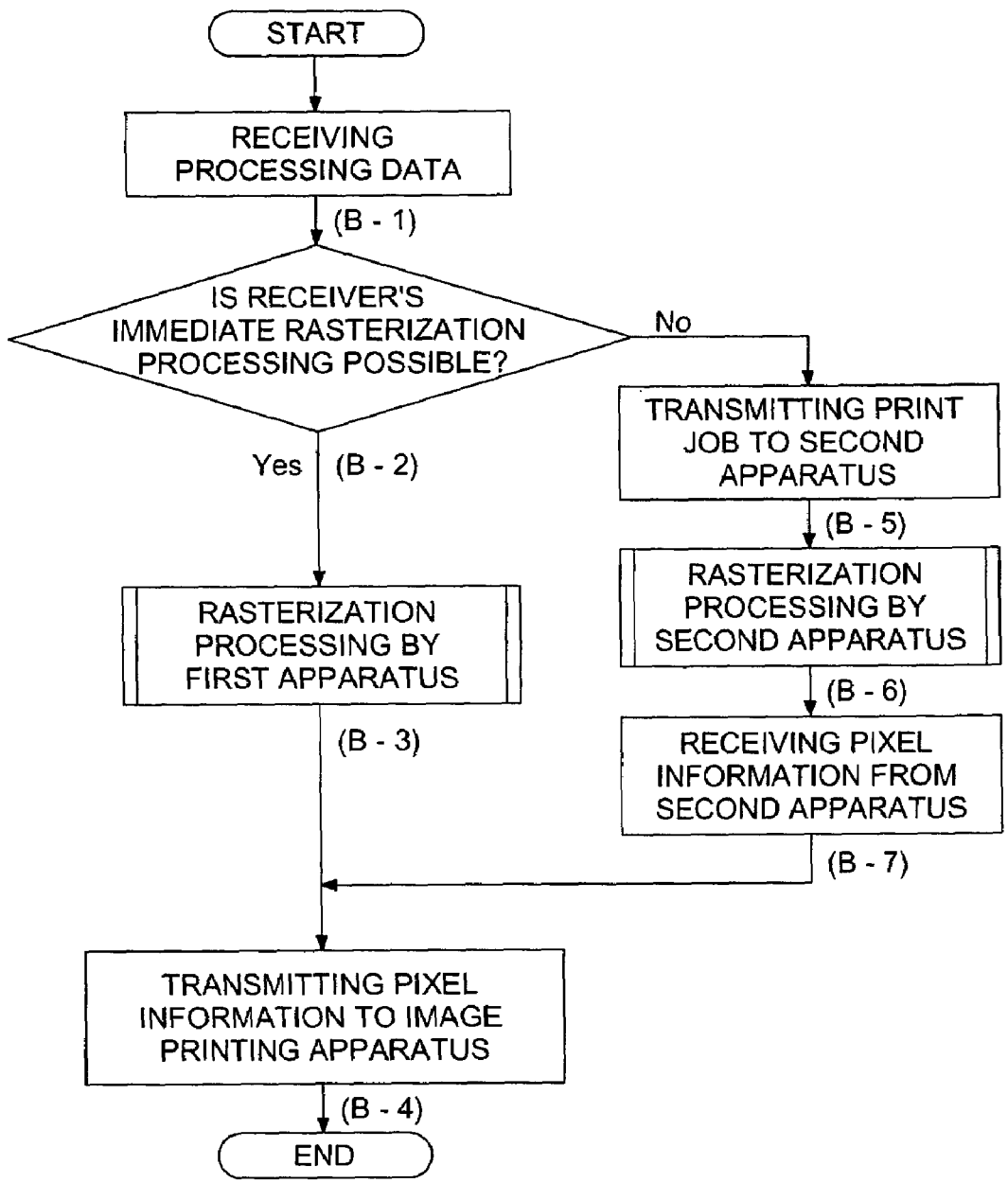
FIG. 4 is a diagram showing the flow chart of the second example of operations of the image processing system shown in FIG. 1.

FIG. 4 is a diagram showing the flow chart of the second example of operations of the image processing system shown in FIG. 1.

After the image processing apparatus 3 receives print JOB (B-1), when the image processing apparatus 3 itself can conduct rasterization processing immediately (B-2), it conducts rasterization processing with its own rasterization processing section 12 (B-3) and transmits pixel information thus obtained to image printing apparatus 2 to conduct printing (B-4).

In contrast to this, when the image processing apparatus 3 cannot start rasterization processing for print JOB received this time because of the processing of another JOB or of other conditions, the image processing apparatus 3 transmits the print JOB received in step (B-1) to image processing apparatus 4 representing another image processing apparatus (B-5). In this case, IP address of the image processing apparatus 3 itself and a JOB number of the print JOB are described in the processing file to be transmitted simultaneously.

The image processing apparatus 4 that has received print JOB from the image processing apparatus 3 rasterizes the received print JOB with its own rasterization processing section (B-6), and after completing the rasterization processing, it transmits pixel information representing the results of the rasterization processing and a processing file on which a JOB number of the print JOB is described to the image processing apparatus 3 that is a client. The image processing apparatus 3 receives the foregoing (B-7), and transmits the pixel information thus obtained to image printing apparatus 2 to execute printing (B-4).

Incidentally, the image processing apparatus 4 that is requested by the image processing apparatus 3 to conduct rasterization processing can further request another image processing apparatus to conduct rasterization processing. Contents of this point will be explained as follows, referring to FIG. 5.

Figure 5:
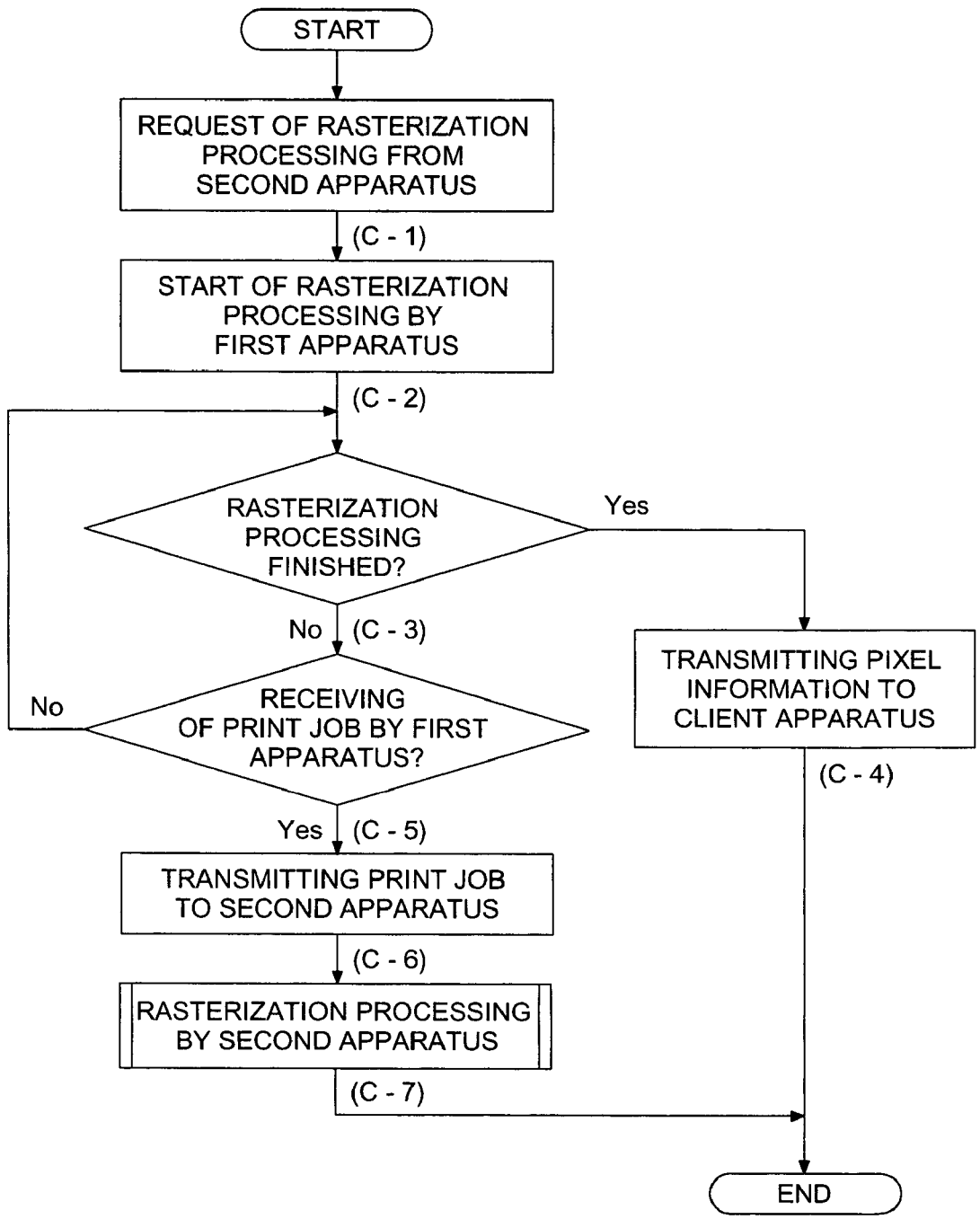
FIG. 5 is a diagram showing the flow chart of the processing carried out in step (B-6) in FIG. 4.

FIG. 5 is a diagram showing the flow chart of the processing carried out in step (B-6) in FIG. 4.

The image processing apparatus 4 requested (C-1) by another image processing apparatus (image processing apparatus 3 in this case) to conduct rasterization processing starts rasterization processing with its own rasterization processing section (C-2).

After completing the rasterization processing (C-3), the image processing apparatus 4 transmits pixel information representing the results of the rasterization processing and a processing file on which a JOB number of the print JOB is described to the image processing apparatus 3 that is a client (C-3).

On the other hand, when it turns out to be impossible (C-5) for the first apparatus to continue rasterization processing requested by another image processing apparatus (image processing apparatus 3 in this case) because of the reason that the first apparatus receives print JOB from image processing apparatus 1, for example, and of the other conditions (that the load is so heavy that a prescribed amount of work cannot be finished within a prescribed period of time, for example), the first apparatus transmits the print JOB requested by the image processing apparatus 3, the pixel information for the partial rasterization processing which has been finished (which may be either in a unit of page or on the half way of a page) and a processing file in which page numbers for the finished rasterization processing are described additionally, to the further different image processing apparatus (image processing apparatus 5 in this case) (C-6) Incidentally, the pixel information, the print JOB and the processing file may be either in separate files respectively, or in the same file.

The image processing apparatus 5 that has received the foregoing conducts the rest of the rasterization processing conducted by the image processing apparatus 4, and after completing it, the image processing apparatus 5 transmits pixel information representing the results of the rasterization processing and the processing file in which a JOB number of the print JOB is described to the image processing apparatus 3 that is an original client.

As explained above, the invention makes it possible to provide an image processing system capable of realizing high-speed rasterization processing without necessity of splitting print JOB and of compounding pixel information, when splitting rasterization processing to a plurality of apparatuses by utilizing the network environment.

In the invention, rasterization processing is conducted on an apparatus having light load, for image data included in print JOB, and thereby, speedup of the rasterization processing for the print JOB can be realized as a result. In addition, a load can be split in a plurality of image processing apparatuses each having a rasterization processing section, and resources in an overall image processing system can be utilized effectively.

Disclosed embodiment can be varied by a skilled person without departing from the spirit and scope of the invention.

What is claimed is:

1. An image processing system to be activated on a network, comprising:

a plurality of image processing apparatuses; and an image printing apparatus that includes an image printing section to print a reproduced image on a sheet;

wherein the plurality of image processing apparatuses and the image printing apparatus are coupled to each other through the network, and each of the plurality of image processing apparatuses includes:

a rasterization processing section to apply a rasterization processing to image data representing anoriginal image;

an image data transmitting section to transmit the image data to another image processing apparatus, being one of the plurality of image processing apparatuses, through the network, so that the other image processing applies the rasterization processing to the image data;

a first pixel-data receiving section to receive pixel data generated as a result of the rasterization processing conducted by the other image-processing apparatus; and a pixel data transmitting section to transmit the pixel data, received by the first pixel-data receiving section, to the image printing apparatus; and wherein the image printing apparatus includes:

a second pixel-data receiving section to receive the pixel data, generated as the result of the rasterization processing conducted by the rasterization processing section, through the network, so that the image printing section prints the reproduced image on the sheet, based on the pixel data received by the second pixel-data receiving section; and wherein, when a predetermined condition occurs in mid-course of the rasterization processing conducted by the rasterization processing section, the image data transmitting section transmits the image data and a completed-part of the pixel data, for which the rasterization processing have been completed by that time, to the other image processing apparatus, so that the other image processing apparatus conducts a continuation of the rasterization processing for the image data.

2. The image processing system of claim 1, wherein the pixel data transmitting section transmits either the pixel data generated as the result of the rasterization processing conducted by the rasterization processing section, or the pixel data received by the first pixel-data receiving section, which is acquired earlier, to the image printing apparatus.

3. The image processing system of claim 1, wherein, when any one of the plurality of image processing apparatuses receives the image data and the completed-part of the pixel data transmitted from the image data transmitting section of the other image processing apparatus coupled to the network, the rasterization processing section of the image processing apparatus concerned conducts a continuation of the rasterization processing for the image data.

* * * * *